Figure 1:
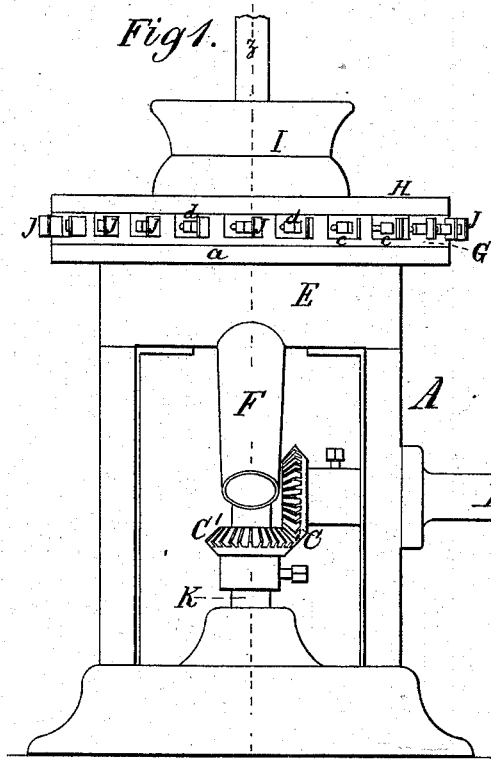

(No Model.)

S. P. SAWYER.
MACHINE FOR MAKING OAT MEAL.

No. 249,206. Patented Nov. 8, 1881.

Witnesses:
J. P. Theo. Lang.
J. F. Munson.

Inventor:
Stephen P. Sawyer
by his attys
Mason, Fenwick & Lawrence

UNITED STATES PATENT OFFICE.

STEPHEN P. SAWYER, OF MUSCATINE, IOWA.

MACHINE FOR MAKING OATMEAL.

SPECIFICATION forming part of Letters Patent No. 249,206, dated November 8, 1881.

Application filed July 5, 1881. (No model.)

*To all whom it may concern:*

Be it known that I, STEPHEN PAYSON SAWYER, a citizen of the United States, residing at Muscatine, in the county of Muscatine and State of Iowa, have invented a new and useful Improvement in Machines for Making Oatmeal, of which the following is a specification.

This invention relates to that description of oatmeal-machine which presents the oats singly to cutters on lines which are parallel with the greatest diameter of the oats, and thus insures the cutting of the oats transversely of their length; and the nature of my invention consists, first, in the combination of a plain-surfaced revolving disk provided with upwardly-projecting teeth at its outer edge with suitable knives applied around this disk in a gage-ring, whereby the hulled oats are passed to the knives singly without being passed through grooved surfaces, which create friction upon one another, and at times grind the oats into particles before they reach the knives, and thus make fine oat-flour instead of oatmeal.

It consist, second, in the ring of teeth formed of durable tempered steel or chilled metal, in combination with the metal disk, said ring being shrunk around a disk of ordinary cast metal, so that its teeth project up above the top surface of the disk at its outer edge. This construction insures the presentation of the oats singly to the knives, while great durability of the ring of teeth is secured and cheapness in the disk effected.

It consists, third, in the combination of the plain-surfaced disk having a ring of teeth at its outer edge and standing up above its surface at said edge, a gage-ring provided with adjustable knives, and also having discharge-passages down through it forward of the cutting-edges of the knives, an oatmeal-chamber below the disk and provided with a discharge-spout, and a revolving discharging-scraper within said chamber. This combination insures the free discharge of the cut substances both at the place where the cutting is performed and also where the meal is deposited below the cutters and disk. It also enables the operator to readily take out and resharpen the knives and adjust them to the toothed ring as occasion may require.

It consists, fourth, in a hopper made flaring and with a dishing form below its upper flared end, in combination with the central spreading washer and with the disk provided with an upwardly-projecting ring or circle of teeth, whereby the oats are freely and properly passed to the knives, and are prevented from rising while the cutting operation is being performed; and it consists, fifth, in a circle of teeth at the periphery of the revolving disk, each of which teeth has the form of a triangle or equivalent form, in combination with oblique knives, whereby the oats are held singly up to the gage-ring and are cut between two thin edges, one of which is formed on a tooth and the other on a knife-blade.

Figure 2:
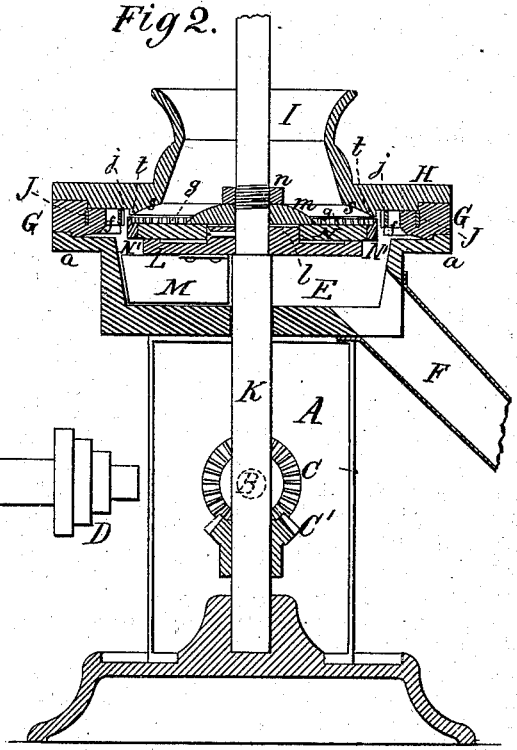
Figure 3:
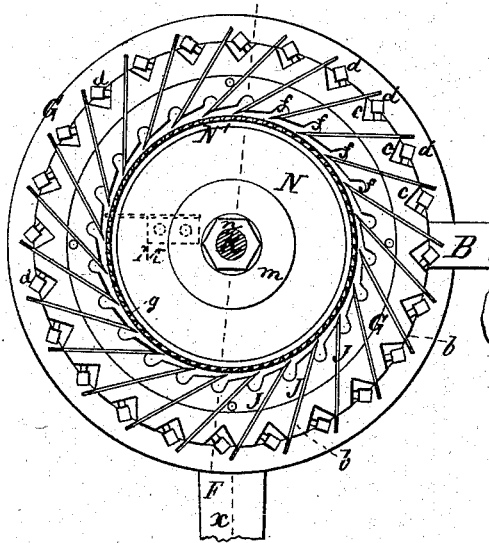
Figure 4:
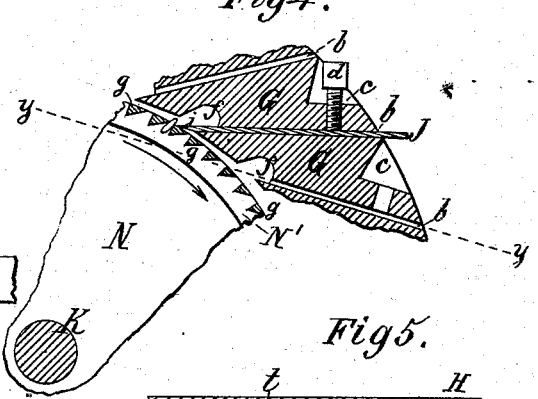
Figure 5:
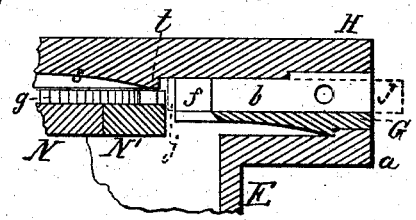

In the accompanying drawings, Figure 1 is a side elevation of my improved machine complete. Fig. 2 is a vertical section of the same on the line $z\ z$ of Fig. 1. Fig. 3 is a top view of the machine with the top plate and hopper removed. Fig. 4 is a broken horizontal section through the gage-ring, cutters or knives, and the teeth of the disk. Fig. 5 is a broken vertical section in the line $y\ y$ of Fig. 4.

The frame A of the machine may consist of a circular base and two strong segmental standards with bottom and top bolting flanges, as shown, or it may be of any other proper form and construction. In one of the standards of this frame the driving-shaft B, provided with a bevel-gear, C, and a cone-pulley, C', is properly boxed and supported.

On top of the standards a circular chamber, E, having a discharging-spout, F, is bolted or otherwise suitably secured. Upon the flange $a$ of the chamber E a gage and knife-holding ring, G, is fitted, and secured in position by screws which fasten the cap-plate H, with its attached hopper I, to the flange of the chamber E. In the upper face of the gage-ring G a series of oblique kerfs, $b$, are cut vertically to a depth equal to the width of the knives which are to be set into them, and at the periphery of this ring a series of triangular recesses, $c$, are cut.

Into the kerfs $b$ steel blades with beveled cutting-edges, the same constituting the knives or cutters $J\ j$, are placed, and through the recessed portions $c$ of the gage-ring set-screws $d$ are passed and made to bear upon and hold the knives in any desired set position, as shown in the drawings.

The inner circular portion of the gage-ring G is constructed with a series of vertical passages, $f$, in form of notches, and one of these passages is forward of each of the beveled edges $j$ of the knives or cutters J. These passages $f$ extend down into the chamber E and discharge the cut-oat product into said chamber.

K is an upright shaft extending from the center of the base of the frame to a position above the hopper I. This shaft is provided with a bevel-gear wheel, C', which gears with the wheel C, and it is caused to revolve rapidly by the shaft B. On this shaft, at a point a little below the top of the chamber E, a circular plate, L, with a collar, $l$, is applied and properly fastened, so as to revolve with the shaft. Upon said plate, and fitted to it by means of said collar $l$ is applied a plain-surfaced disk N, and this disk is clamped in position by means of a convex oat spreading or diffusing washer, $m$, and a nut, $n$, as shown. The disk thus applied will revolve with the shaft K, and its upper surface stand on a plane about with the bottom edges of the knives or cutters J. Around the edge of this disk a steel band, N', is shrunk, with its upper edge standing above the upper surface of the disk. The upward extending edge of the band is formed with teeth $g$, of triangular or other equivalent form, and between these teeth notches having one or both of their binding-surfaces beveled or tangential to the disk are formed, as shown in the drawings. The notches are of a size corresponding to a single oat, or thereabout, and when the oats are thrown in mass by centrifugal force toward these notches they will singly be presented lengthwise to the knives and be cut transversely of their length as the disk revolves. The sharp edge presented by each of the teeth acts in concert with the sharp beveled edge of a knife, and thus the cutting operation is performed in the most perfect manner. The cut product escapes at once into the chamber by way of the passages $f$, and it is swept out of the chamber by means of a thin wing, M, fastened to the under side of the plate L in the same manner as in other machines or flour-bolts.

In order to have a free flow for the oats as they come into the machine from the hopper I, the lower part of the hopper is flared almost to a diameter equal to the disk N, and at the terminus of this flaring portion the hopper is made to continue outward with a concave or dishing form, as indicated at $s$. By this construction the oats are allowed to flow in space all around the central shaft K and out to the toothed ring of the disk N, and thus no grinding action, such as is produced at times by grooved conducting-disks, is experienced. The dishing form of the hopper at $s$ extends to the teeth of the ring, and by the terminus $t$ of this dished portion the oats are prevented from rising after they have passed between the teeth and while they are being cut.

The knives can be readily removed for resharpening by loosening the set-screws, and they can always be set to bear a close cutting relation to the toothed ring. The fineness of the sections cut at each action of the knives upon the oats will depend upon the distance which the cutting-edges of the knives stand from the inner gaging-surface of the ring. This distance can be changed by having the inner edge of the gaging-ring stand farther from or nearer to the outer periphery of the toothed ring.

In practice the teeth of the ring might be substituted by pins set into the disk at its periphery so as to project up above the surface of the disk; but I believe the construction shown is the best of any known to me.

I am aware that grooves and ribs with an eccentric termination at their inner ends have been formed radially upon the top surface of disks placed beneath the bottom plate of a hopper or the cap-plate of the machine, and that in some cases the grooves and ribs have been formed on both the under side of the hopper and upon the top of the disk; but with such constructions a portion of the oats is liable to be ground before arriving at the points of cutting, and hence it is very important to make the entire surface of the disk which conducts the oats to the knives smooth and without grooves and ribs. It is also important, in order to insure the passage of the oats from the plain-surfaced disk to the knives, to form the passages between the teeth on lines which are tangential to the axis of rotation of the disk, and hence I have formed the teeth, which are very narrow, with a beveled surface on one or both of their vertical sides.

What I claim as my invention, and desire to secure by Letters Patent, is—

1. The combination of a plain-surfaced revolving disk provided with upwardly-projecting teeth at its outer edge with the gage-ring provided with knives or cutters arranged around the disk, substantially as and for the purpose described.

2. The disk provided with a toothed ring, which is shrunk around it, so that the teeth project up above the surface of the disk at its outer edge, substantially as and for the purpose described.

3. The combination of the plain-surfaced disk having a toothed ring at its outer edge, the teeth of said ring standing up above the surface of the disk, a gage-ring provided with adjustable knives and discharge-passages, with an oatmeal-receiving chamber and a discharging-scraper, substantially as and for the purpose described.

4. The combination of a hopper made flaring and with a dishing-form below its upper flared end, a central spreading-washer, a plain-surfaced disk having a circle of teeth at its periphery, and a gage-ring having knives, substantially as and for the purpose described.

5. The plain-surfaced disk having a circle of teeth at its periphery, each tooth having a triangular or other equivalent form, in combination with a gage-ring having obliquely-arranged knives, substantially as and for the purpose described.

6. The combination of the plain-surfaced disk having separating-teeth only on its periphery, the hopper set up in relief from the plain surface of the disk, the gage-ring provided with the obliquely-arranged knives, and the throats or vertical discharge-passages, whereby the oats are allowed, under the action of centrifugal force, to pass over a smooth surface in a free space between the under surface of the hopper and the upper surface of the disk until they enter and pass on tangential lines between the teeth at the periphery of said disk, and then are held until cut into oatmeal by the obliquely-arranged cutters of the gage-ring, and the product discharged vertically through the throats of the knives, substantially as described.

7. In an oatmeal-machine, the combination of the plain-surfaced disk provided with narrow upwardly-projecting beveled teeth at its extreme outer edge, which teeth form passages tangential to the axis of rotation of the shaft of the disk for the oats to pass through singly on their way to the knives, the hopper having a dishing form below its upper flared end, and being arranged in relief from the plain surface of the disk to operate in conjunction with the teeth and the plain-surfaced disk, and the gage-ring provided with discharge-passages or throats, and with knives arranged obliquely to the circle of teeth at the periphery of the disk, all substantially in the manner and for the purpose described.

STEPHEN PAYSON SAWYER.

Witnesses:
   GEO. W. VAN HORNE,
   ROBERT WILLIAMS.